(12) United States Patent
Khanvilkar et al.

(10) Patent No.: US 11,659,088 B1
(45) Date of Patent: May 23, 2023

(54) SYSTEM AND METHOD ENHANCING CUSTOMERS SATISFACTION BY ASSIGNING ABANDONED INBOUND-INTERACTIONS TO AGENTS EACH ON A SATISFACTORY DIGITAL-CHANNEL TYPE

(71) Applicant: inContact INC., Sandy, UT (US)

(72) Inventors: Kunal Khanvilkar, Maharashtra (IN); Rahul Vyas, Rajasthan (IN); Salil Dhawan, Maharashtra (IN); Sourav Chauhan, New Delhi (IN)

(73) Assignee: INCONTACT INC., Sandy, UT (US)

( * ) Notice: Subject to any disclaimer, the term of this patent is extended or adjusted under 35 U.S.C. 154(b) by 0 days.

(21) Appl. No.: 17/665,538

(22) Filed: Feb. 6, 2022

(51) Int. Cl.
*H04M 3/51* (2006.01)
*G06Q 10/06* (2023.01)
*H04M 3/493* (2006.01)
*G06Q 10/0639* (2023.01)

(52) U.S. Cl.
CPC .... *H04M 3/5183* (2013.01); *G06Q 10/06393* (2013.01); *G06Q 10/06398* (2013.01); *H04M 3/493* (2013.01); *H04M 3/5166* (2013.01)

(58) Field of Classification Search
CPC .. H04M 3/5183; H04M 3/493; H04M 3/5166; G06Q 10/06393; G06Q 10/0639
USPC ........... 379/265.06, 265.11, 265.12, 265.05, 379/265.01, 265.13, 265.02
See application file for complete search history.

(56) References Cited

U.S. PATENT DOCUMENTS

| | | | |
|---|---|---|---|
| 8,649,500 B1 * | 2/2014 | Cohen | H04M 3/5158 379/265.11 |
| 2022/0046130 A1 * | 2/2022 | Burmeister | H04M 3/5158 |

* cited by examiner

*Primary Examiner* — Thjuan K Addy
(74) *Attorney, Agent, or Firm* — Soroker-Agmon-Nordman; Sharone Godesh; Daniel Schatz

(57) ABSTRACT

A computerized-method for enhancing customers satisfaction by assigning abandoned inbound-interactions to agents each on a satisfactory-digital-channel type. The computerized-method may include operating an Abandoned-Interactions-Input-Utilization (AIIU) module. The AIIU-module may include: (a) operating an accumulator-module to: (i) retrieve abandoned inbound-interactions from the data store of abandoned inbound-interactions and (ii) forward details of the abandoned inbound-interactions to an analyzer-module; (b) for each abandoned inbound-interaction of the abandoned inbound-interactions, a. operating the analyzer-module on the forwarded details of abandoned inbound-interactions to: (i) extract query context and metadata; and (ii) identify a satisfactory-digital-channel type; b. operating a processor-module to: (i) identify an agent having skills to handle the extracted query and (ii) prepare a task based on the extracted query context and metadata and the identified satisfactory digital-channel type; and (c) sending the task to a routing-system to be assigned to the identified agent for operation thereof via the identified satisfactory-digital-channel type.

9 Claims, 7 Drawing Sheets

400

410

| | | | | | | | | | | |
|---|---|---|---|---|---|---|---|---|---|---|
| Plan details | | | | | | | | | | |
| Account information | | | | | | | | | | |
| Bill Pay | | | | | | | | | | |

420

| Business Context | CSAT Score | Recommended channel list based on CSAT score | Customer preferred channels | Customer negatively rated channels | Final Recommendation |
|---|---|---|---|---|---|
| Plan details | • WeChat – 4.6<br>• Email – 7.8<br>• Fb messenger – 2.5<br>• SMS – 7.4<br>• WhatsApp – 8.2 | | | | |
| Account information | • Line – 5.0<br>• Email – 2.2<br>• SMS – 9.4<br>• Apple account – 6.3<br>• Viber – 7.7 | | | | |
| Bill pay | • Twitter – 4.2<br>• Apple account – 6.3<br>• Email – 1.0<br>• WhatsApp – 7.2<br>• SMS – 1.4 | | | | |

Figure 4

SYSTEM AND METHOD ENHANCING CUSTOMERS SATISFACTION BY ASSIGNING ABANDONED INBOUND-INTERACTIONS TO AGENTS EACH ON A SATISFACTORY DIGITAL-CHANNEL TYPE

TECHNICAL FIELD

The present disclosure relates to the field of data, analyzing and more specifically to identifying a satisfactory digital-channel type for an abandoned inbound-interaction for resolution thereof.

BACKGROUND

Contact centers constantly strive to increase their efficiency by improving agent productivity and utilization rates as well as improving Net Promoter Score (NTS) by keeping customers satisfied.

An abandoned interaction, in contact centers, refers to a contact, i.e., interaction, that ended by an initiating customer before it reached an agent. A common scenario of the abandoned interaction is for example, when a customer makes an inbound-interaction, and then gets tired of waiting in the queue of inbound-interactions and hangs up before the agent answers.

In contact centers, the interaction abandonment metric is closely tied to service level Key Performance Indicators (KPI)s and customer satisfaction metrics. Every abandoned interaction may represent a missed opportunity to make a sale or strengthen customers engagement. Additionally, high abandoned inbound-interactions rates mean that customer satisfaction is taking a hit.

Currently, workforce managers and other operational leaders keep a close eye on abandoned intersections rates throughout the day to make intraday adjustments to correct higher than average. abandoned inbound-interactions rates by manually generating reports with details of abandoned interactions. Some of the abandoned interactions in the reports are manually examined and assigned to agents for resolution via an arbitrary channel type. However, the arbitrary channel type may not be the best suited for the query context from the customer aspect, resolving an invoice error via Short Message Service (SMS) channel type, which may be followed by a low satisfactory score.

Furthermore, it is most likely that abandoned calls or any other form of inbound interactions do not require the attention of a live agent through a voice channel and the issue of the customer may be resolved via a digital channel which cheaper than voice channel. Moreover, current technical solutions do not analyze customer communication preferences and Customer Satisfaction Score (CSAT) score of historical interactions related to customer's query context to identify the most satisfactory digital-channel to resolve the customer's query.

Currently, there is no available effective mechanism which helps to resolve a customer query on digital channels by analyzing and utilizing the abandoned interaction inputs. Therefore, there is a need for a technical solution for improving customer satisfaction by analyzing details of abandoned interactions and utilizing them to assign the abandoned interactions to agents via a satisfactory digital-channel type.

SUMMARY

There is thus provided, in accordance with some embodiments of the present disclosure, a computerized-Method for enhancing customers satisfaction by assigning abandoned inbound, interactions to agents each on a satisfactory digital-channel type.

Furthermore, in accordance with some embodiments of the present disclosure, in a computerized system that includes one or more processors, a data store of abandoned inbound- interactions; and a memory to store the data store, the one or more processors may operate an Abandoned Interactions Input Utilization (AIIU) module.

Furthermore, in accordance with some embodiments of the present disclosure, the AIIU module may operate an accumulator module to: (i) retrieve abandoned inbound-interactions from the data store of abandoned inbound-interactions and (ii) forward details of the abandoned inbound, interactions to an analyzer module; for each abandoned inbound-interaction of the abandoned inbound-interactions, the AIIU module may a. operate the analyzer module on the forwarded details of abandoned inbound-interactions to: (i) extract query context and metadata; and (ii) identify a satisfactory digital-channel type; and b. operate a processor module to: (i) identify an agent having skills to handle the extracted query and (ii) prepare a task based on the extracted query context and metadata and the identified satisfactory digital-channel type.

Furthermore, in accordance with some embodiments of the present disclosure, the AIIU may further send the task to a routing system to be assigned to the identified agent for operation thereof via the identified satisfactory digital-channel type.

Furthermore, in accordance with some embodiments of the present disclosure, the analyzer module may identify the satisfactory digital-channel-type by: (i) retrieving one or more digital-channel preferences of a customer related to the abandoned inbound-interaction from a data store of customer presence on digital-channels; (ii) retrieving data of interactions having the query context of the abandoned inbound-interaction to extract one or more digital-channel types thereof from a data store of historical-interactions; (iii) comparing the one or more digital-channel preferences of the customer and the extracted one or more digital-channel types to yield a list of common. digital-channel types; and (iv) identifying a digital-channel type of an interaction having a highest Customer Satisfaction Score (CSAT) and a digital-channel type in the yielded list of common digital-channel types, in the retrieved data of interactions having the query context of the abandoned inbound-interaction as the satisfactory digital-channel type. Optionally, the retrieving of. ne or more digital-channel preferences of a customer related to the abandoned inbound-interaction may include customer negatively rated channels which may not be used for the assigned task.

Furthermore, in accordance with some embodiments of the present disclosure, the details of the abandoned inbound-interactions may be stored m the data store of abandoned inbound-interactions as part of a process (i) inbound. interactive Voice Response (IVR) interaction or (ii) inbound Chat-interaction with a bot.

Furthermore, in accordance with some embodiments of the present disclosure, the accumulator module may remove abandoned inbound-interactions which lack a preconfigured required-input in the details abandoned inbound-interactions before the accumulator module forwards the details of the abandoned inbound-interactions to the analyzer module.

Furthermore, in accordance with some embodiments of the present disclosure, the details of the abandoned inbound-interactions may be forwarded by using a file format of: JavaScript Object Notation (BON) or an Extensible Markup Language (XML).

Furthermore, in accordance with some embodiments of the present disclosure, a task includes at least two of: (i) query context; (ii) customer details: (iii) digital channel type: (iv) preferred contact time: and (v) priority.

Furthermore, in accordance with some embodiments of the present disclosure, when the computerized-method may operate in a cloud computing environment, before operating the AIIU module the computerized-method is further comprising selecting a tenant from a data store of tenants to operate the AHU module for abandoned interactions of the selected tenant.

Furthermore, in accordance with some embodiments of the present disclosure, the AIIU module may operate every preconfigured duty cycle.

There is further provided a computerized-system for enhancing customers satisfaction by assigning abandoned inbound-interactions to agents each on a satisfactory digital-channel type.

Furthermore, in accordance with some embodiments of the present disclosure, the computerized-system may include one or more processors, a data store of abandoned inbound-interactions and a memory to store the data store.

Furthermore, in accordance with some embodiments of the present disclosure, the one or more processors may be configured to operate the AIIU module.

Furthermore, in accordance with some embodiments of the present disclosure, the AIIU module may include: (a) operating an accumulator module to: (i) retrieve abandoned inbound-interactions from the data store of abandoned inbound-interactions and (ii) forward details of the abandoned inbound-interactions to an analyzer module: (b) for each abandoned inbound-interaction of the abandoned inbound-interactions, a. operating the analyzer module on the forwarded details of abandoned inbound-interactions to: (i) extract query context and metadata; and (ii) identify a satisfactory digital-channel type; b. operating a processor module to: (i) identify an agent having skills to handle the extracted piety and (ii) prepare a task based on the extracted query context and metadata and the identified satisfactory digital-channel type; and (c) sending the task to a routing system to be assigned to the identified agent fora operation thereof via the identified satisfactory digital-channel type.

BRIEF DESCRIPTION OF THE DRAWINGS

FIG. 4 schematically illustrates an example of identification of a satisfactory digital-channel type, in accordance with some embodiments of the present disclosure;

DETAILED DESCRIPTION

Figure 1A:
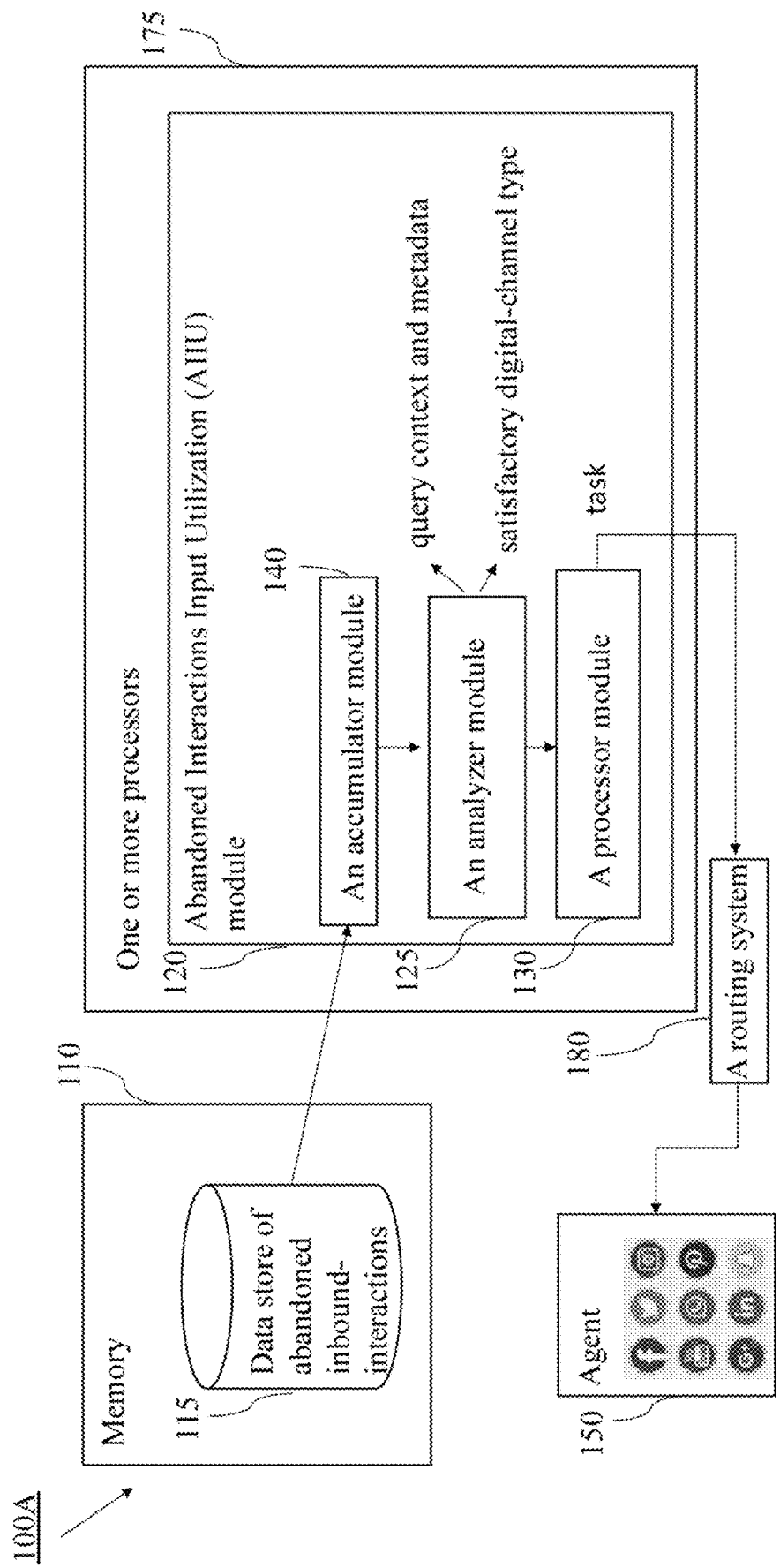
FIGS. 1A-1B schematically illustrate a high-level diagram of a system for enhancing customers satisfaction by sending abandoned inbound-interactions to a routing system to be assigned to agents each on a satisfactory digital-channel type, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

In contact centers a call abandonment metric is closely tied to service level. KPIs and to customer satisfaction metrics. Every abandoned contact represents a missed opportunity to make a sale or strengthen customer engagement. Additionally, high abandon rates likely mean that customer satisfaction is taking a hit.

Workforce managers and other operational leaders keep a close eye on abandon rates throughout the day and make intraday adjustments to try to correct higher than average abandon rates. Currently, there is no technical solution which resolves customer query on digital channels by analyzing and utilizing abandon interaction inputs.

Therefore, there is a need for method and system for enhancing customers satisfaction by assigning abandoned inbound-interactions to agents each on a satisfactory digital-channel type.

The term "satisfactory digital-channel type" as used herein, refers to a digital-channel type which is an intersection between customer preference and a high Customer Satisfaction Score (CSAT) of a digital-channel type for a query context. A satisfactory digital-channel type is a channel type that is most likely will result with a high CSAT given the query context than other digital-channel types.

According to some embodiments of the present disclosure, the digital-channel types may include for example, Whatsapp chat, Facebook messenger chat, Twitter chat, Instagram chat, Google chat, Pinterest chat and the like.

FIG. 1A schematically illustrates a high-level diagram of a system 100A. for enhancing customers satisfaction by sending abandoned inbound-interactions to a routing system to be assigned to agents each on a satisfactory digital-channel type, in accordance with some embodiments of the present disclosure.

According to some embodiments of the present disclosure, system 100A may gather abandoned interactions and check customer provided inputs related to a query to utilize the inputs to create a task which may be sent to a routing system 180 to be assigned as a work item to an agent for query resolution on an identified satisfactory digital-channel type. Thus, improving agents productivity and utilization rates which results with satisfied customers and an improved Net Promoter Score (NPS).

According to some embodiments of the present disclosure, a computerized system, such as system 100A may include one or more processors 175. a data store, such as data store of abandoned inbound-interactions 115 and a memory 110 to store the data store. The one or more processors 175 may operate a module, such as Abandoned Interactions Input Utilization (AIIU) module 120, and such as AIIU module 200 in FIG. 2.

According to some embodiments of the present disclosure, the ATTU module 120, may operate a module, such as an accumulator module 140 to: (1) retrieve abandoned inbound-interactions from a data store, such as data store of abandoned inbound-interactions 115 and (ii) forward details of the retrieved abandoned inbound-interactions to a module, such as an analyzer module 125.

According to some embodiments of the present disclosure, the details of the retrieved abandoned inbound-interactions may include for example, customer gum' context, customer details, preferred time to speak with the agent and priority. The query context may be for example, credit card query, plan change, invoice error and the like. The query context may also include the issue of the query. For example, for credit card query the issue may be, online transaction not working.

According to some embodiments of the present disclosure, for each abandoned inbound- interaction of the abandoned inbound-interactions, the AIIU module 120 may operate the analyzer module 125 on the forwarded details of abandoned inbound-interactions to: (i) extract query context and metadata and (ii) identify a satisfactory digital-channel type. The metadata of a query may be provided during an initial IVR or bot chat, such as customer details, e.g., email address and phone number, preferred time for interaction and priority. The details of the abandoned inbound-interactions may include, for example, interaction identification number, interaction duration, interaction start time, interaction end time, interaction date, a channel type and in a cloud-based environment, a tenant identification number.

According to some embodiments of the present disclosure, for each abandoned inbound- interaction of the abandoned inbound-interactions, the AEU module 120 may further operate a module, such as a processor module 130 to: (i) identify an agent 150 having skills to handle the extracted query and (ii) prepare a task based on the extracted query context and metadata and the identified satisfactory digital-channel type.

According to some embodiments of the present disclosure, a task may include at least two of: (i) query context; (ii) customer details; (iii) digital channel type; (iv) preferred contact time; and (v) priority. Optionally, the task may include a transcript of the query if it has been provided by the customer.

According to some embodiments of the present disclosure, the AIIU module 120 may send the task to a routing system 180 to be assigned for operation thereof, to the identified agent 150, via the identified satisfactory digital-channel type.

According to some embodiments of the present disclosure, the details of the abandoned inbound-interactions may be stored in the data store of abandoned inbound-interactions 115 as part of a process of: (i) inbound Interactive Voice Response (IVR) interaction or (ii) inbound chat-interaction with a bot.

According to some embodiments of the present disclosure, the accumulator module 140 may remove abandoned inbound-interactions which lack a preconfigured required-input in the details abandoned inbound-interactions before the accumulator module 140 forwards the details of the abandoned inbound-interactions to the analyzer module 125.

According to some embodiments of the present disclosure, the details of the abandoned inbound-interactions may be forwarded by using a file format of: JavaScript Object Notation (JSON) or an Extensible Markup Language (XML).

According to some embodiments of the present disclosure, when system 100A may operate in a cloud computing environment, before operating the AIIU module 120 selecting a tenant from a data store of tenants to operate the AIIU module 120 for abandoned interactions of the selected tenant.

According to some embodiments of the present disclosure, the AIIU module 120 may operate every preconfigured duty cycle.

Figure 1B:
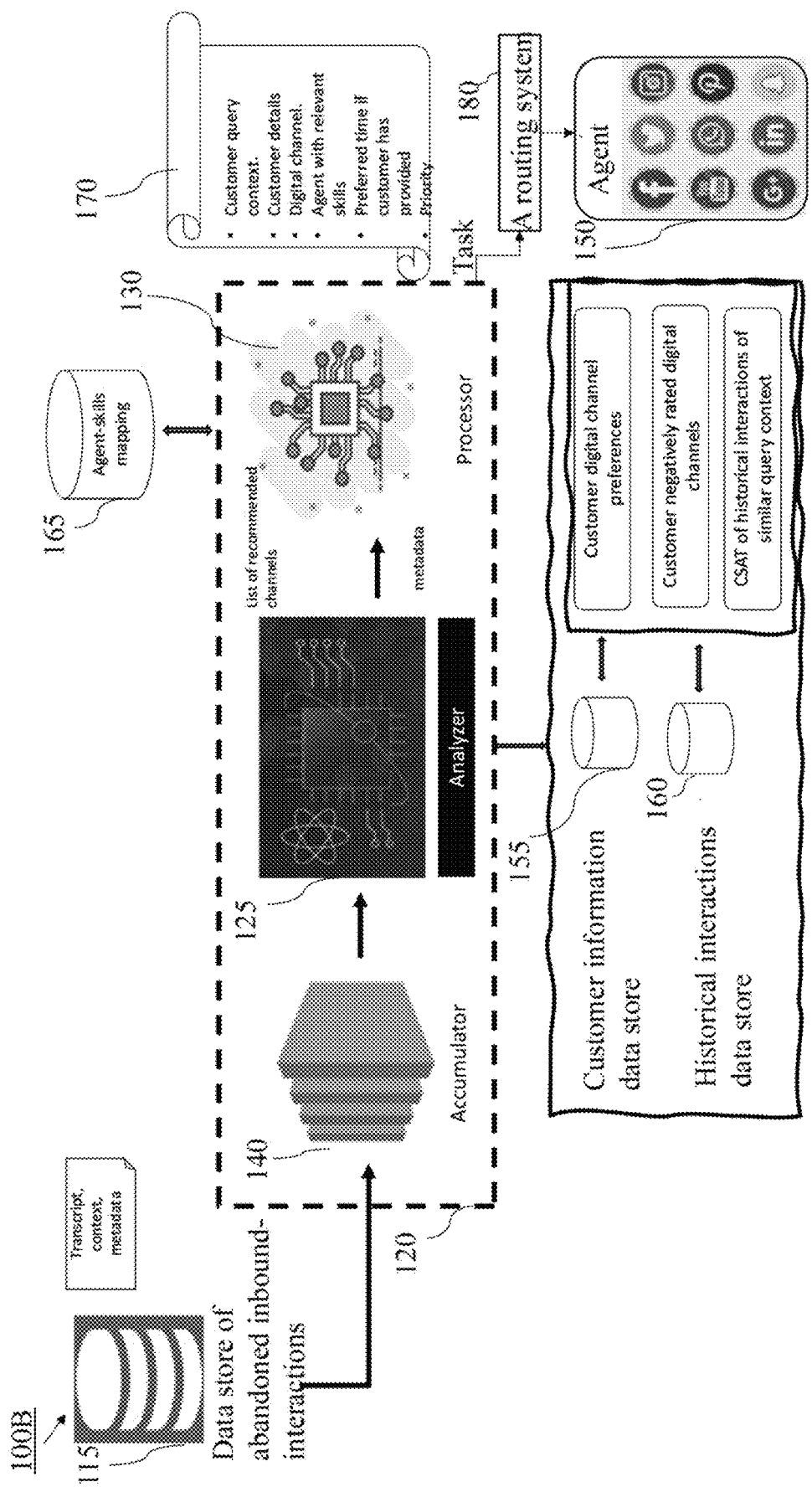

FIGS. 1B schematically illustrate a high-level diagram of a system 100B for enhancing customers satisfaction by sending abandoned inbound-interactions to a routing system to be assigned to agents each on a satisfactory digital-channel type, in accordance with some embodiments of the present disclosure.

According to some embodiments of the present disclosure, system 100B may include the same elements as system 100A.

According to some embodiments of the present disclosure, the AIIU module 120 may operate an accumulator module, such as accumulator module 140 may be used to periodically fetch interactions related information from the abandoned inbound-interactions data store 115. Once the data is being fetched, it may be then sent to a filtration unit to remove abandoned inbound-interactions which lack a preconfigured required-input in the details abandoned inbound-interactions be we: the accumulator module 140 forwards the details of the abandoned inbound-interactions to an analyzer module 125.

According to some embodiments of the present disclosure, the analyzer module 125 may identify a satisfactory digital-channel-type by: (i) retrieving one or more digital-channel preferences of a customer related to the abandoned inbound-interaction from a data store, such as a data store of customer information 155 which is a data store of customer presence on digital-channels that may store the customer identification (ID) and a list of all digital channels that were used by the customer in the past when approached to the contact center.

According to some embodiments of the present disclosure, the analyzer module 125 may further retrieve data of interactions having the query context of the abandoned inbound-interaction to extract one or more digital-channel types thereof from a data store, such as a data store of historical-interactions 160 and then compare the one or more digital-channel preferences of the customer and the extracted one or more digital-channel types to yield a list of common digital-channel types.

According to sonic embodiments of the present disclosure, optionally, the retrieving of the one or more digital-channel preferences of the customer may include customer negatively rated channels, which may not be used for the assigned task.

According to some embodiments of the present disclosure, the analyzer module 125 may then identify a digital-channel type of an interaction having a highest Customer Satisfaction Score (CSAT) and a digital-channel type in the yielded list of common digital-channel types, in the retrieved data of interactions having the query context of the abandoned inbound-interaction, as the satisfactory digital-channel type.

According to some embodiments of the present disclosure, metadata of the abandoned inbound-interaction may be forwarded to the processor module 130. The processor module 130 may identify an agent having skills to handle the extracted query and prepare a task, e.g., task 170 based on the extracted query context and metadata and the identified satisfactory digital-channel type.

According to some embodiments of the present disclosure, the Any module 120 may send the task 170 to routing system 180 to be assigned to the identified agent, e.g., agent 150 for operation thereof via the identified satisfactory digital-channel type.

According to some embodiments of the present disclosure, the processor module 130 may identify an agent having skills to handle the extracted query by retrieving data from a data store such as agent-skills mapping data store 165.

Figure 2:
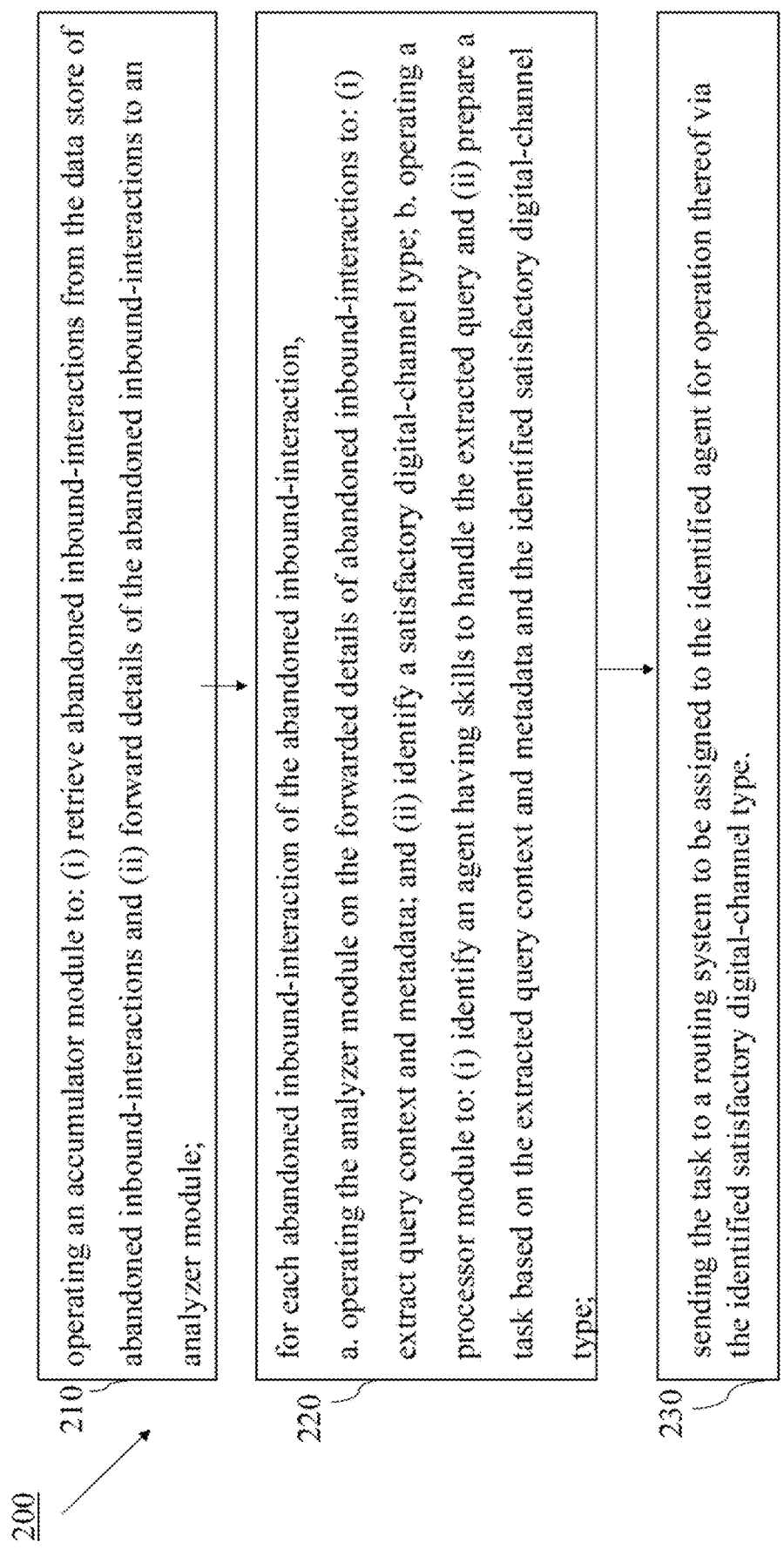
FIG. 2 is a high-level workflow of an Abandoned Interactions Input Utilization (AIIU) module, in accordance with some embodiments of the present disclosure.

FIG. 2 is a high-level workflow of an Abandoned Interactions Input Utilization (AIIU) module 200, in accordance with some embodiments of he. present disclosure.

According to some embodiments of the present disclosure,, operation 210 may comprise operating an accumulator module to: (i) retrieve abandoned inbound-interactions from the data store of abandoned inbound-interactions and (ii) forward details of the abandoned inbound-interactions to an analyzer module.

According to some embodiments of the present disclosure, operation 220 may comprise for each abandoned inbound-interaction of the abandoned inbound-interactions, a. operating the analyzer module on the forwarded details of abandoned inbound-interactions to: (i) extract query context and metadata, and (ii) identify a satisfactory digital-channel type; b. operating a processor module to: (i) identify an agent haying skills to handle the extracted query and (ii) prepare a task based on the extracted query context and metadata and the identified satisfactory digital-channel type.

According to some embodiments of the present disclosure, operation 230 may comprise sending the task to a routing system 180 to be assigned to the identified agent for operation thereof via the identified satisfactory digital-channel type.

Figure 3:
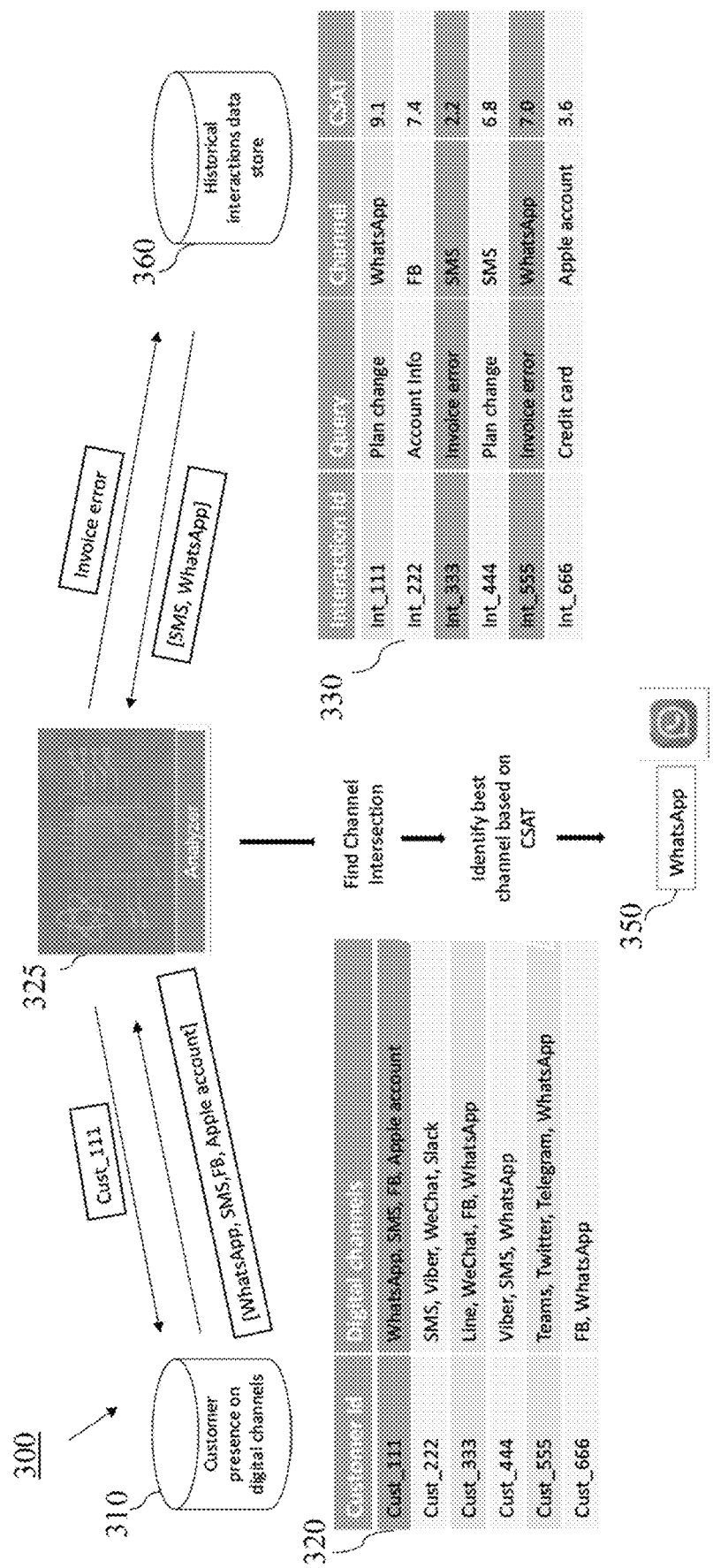
FIG. 3 is a graphic representation of identification of a satisfactory digital-channel type, in accordance with some embodiments of the present disclosure.

FIG. 3 is a graphic representation of identification of a satisfactory digital-channel type 300, in accordance with some embodiments of the present disclosure.

According to some embodiments of the present disclosure, a module, such as analyzer module 325 and such as analyzer module 125 in FIGS. 1A-1B may retrieve digital-channel types of the customer of the abandoned inbound-interaction from a data store such as data store of customer presence on digital-channels 310 and such as customer information data store 155 in FIG. 1B. For example, as shown in table 320, far customer cust_111 the retrieved digital-channels where customer cust_111 has been present in previous interactions are WhatsApp, Short Message Service (SMS), Facebook messenger (FB) and Apple account.

According to some embodiments of the present disclosure, the analyzer module 325 may retrieve data of interactions having the query context of the abandoned inbound-interaction to extract one or more digital-channel types thereof from a data store, such as the data store of historical-interactions 360 and such as the data store of historical-interactions 160 in FIG. 1B. For example, the query context of the abandoned inbound-interaction of cust_111 may be invoice error. As shown in table 330 the retrieved data of interactions having the query context of the abandoned inbound-interaction to extract one or more digital-channel types thereof may for example, include data of interactions int_333 and int_555 and the channel type and CSAT score for each interaction.

According to some embodiments of the present disclosure, the analyzer module 325 may compare the one or more digital-channel preferences of the customer and the extracted one or more digital-channel types to yield a list of common digital-channel types. For example, for customer cust_111 the retrieved digital-channels are WhatsApp, Short Message Service (SMS). Facebook messenger (FB) and Apple account and for the query context invoice error the retrieved data from the data store of historical interactions 360 may include, as shown in table 330, digital-channel types SMS and WhatsApp for the query context of invoice error. Accordingly the list of common digital-channel types may include SMS and WhatsApp.

According to some embodiments of the present disclosure, the analyzer module 325 may identity a digital-channel type of an interaction having a highest Customer Satisfaction Score (CSAT) and a digital-channel type in the yielded list of common digital-channel types, in the retrieved data of interactions having the query context of the abandoned inbound-interaction as the satisfactory digital-channel type. For example, as shown in table 330, interaction int_555 has a CSAT score of '7' which is higher than the CSAT score of '2.2' of interaction int_333. Accordingly, the identified digital-channel type as the satisfactory digital-channel type is the digital channel with the highest CSAT score, which is also in the yielded list of common digital-channel types is WhatsApp 350.

FIG. 4 schematically illustrates an example 400 of identification of a satisfactory digital-channel type, in accordance with some embodiments of the present disclosure.

According to some embodiments of the present disclosure, in a non-limiting example, query context such as plan details, account information and bill pay may be provided by a contact center via the digital-channel type listed in table 410.

According to some embodiments of the present disclosure, as shown in table 420, for example, for a query context of 'plain details', the highest CSAT scores are of email '7.8' and WhatsApp '8.2' which will be recommended based on CSAT score and the customer preferred channels may be WhatsApp and Facebook messenger therefore a module, such as analyzer module 125 in Figs. 1A-1B may identify a digital-channel type of an interaction having a highest CSAT and a digital-channel type in the yielded list of common digital-channel types, in the retrieved data of interactions having the query context of the abandoned inbound-interaction as the satisfactory digital-channel type e.g., WhatsApp. Optionally, in addition to the customer preferred channels customer negatively rated channels may be also taken into account by not using it for the assigned task.

According to some embodiments of the present disclosure, in yet another example, for a query context of 'account information', the highest CSAT scores are of SMS '9.4' and Viber '7.7' which will he recommended based on CSAT score and the customer negatively rated channels may be channels in which user experience was degraded resulting in a poor customer feedback, such as Skype chat, therefore a module, such as analyzer module 125 in FIGS. 1A-1B may identify a digital-channel type of an interaction having a highest CSAT and a digital-channel type in the yielded list of common digital-Channel types, in the retrieved data of interactions having the query context of tine abandoned inbound-interaction as the satisfactory digital-channel type, e.g., SMS.

According to some embodiments of the present disclosure, in yet another example, for a query context of 'bill pay', the highest CSAT scores are of Apple Account '6.3' and WhatsApp '7.2' which will be recommended based on CSAT score and the customer preferred channels may be Apple account and customer negatively rated channels may be email and, therefore a module, such as analyzer module 125 in FIGS. 1A-1B may identify a digital-channel type of an interaction having a highest CSAT and a digital-channel type in the yielded list of common digital-channel types, in the retrieved data of interactions having the query context of the abandoned inbound-interaction as the satisfactory digital-channel type e.g., Apple account.

Figure 5A:
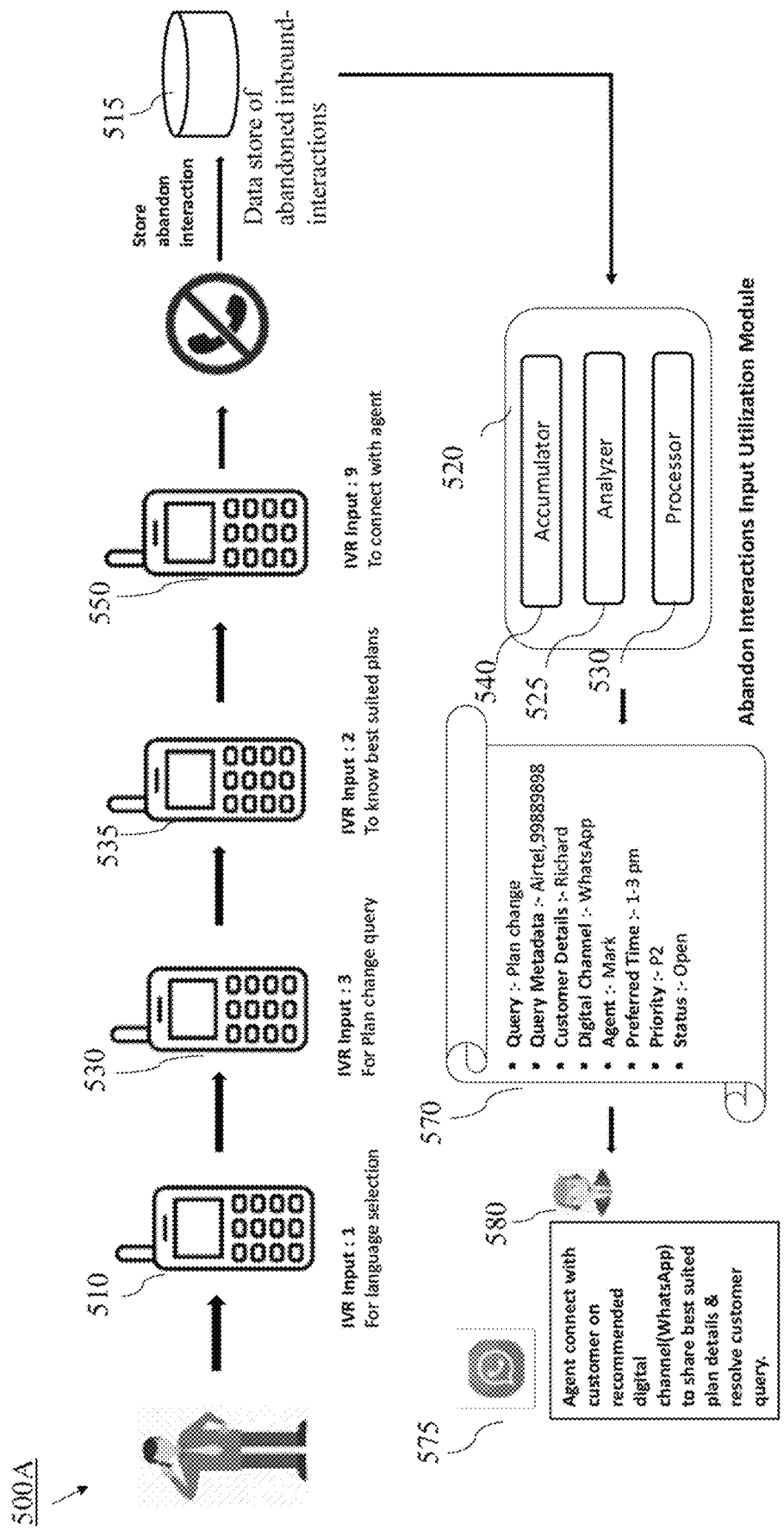
FIG. 5A schematically illustrates the details of the abandoned inbound-interactions received from a process of inbound Interactive Voice Response (IVR) interaction, in accordance with some embodiments of the present disclosure.

FIG. 5A schematically illustrates details of the abandoned inbound-interactions received from a process of inbound Interactive Voice Response (IVR) interaction 500A, in accordance with some embodiments of the present disclosure.

According to some embodiments of the present disclosure, the details of the abandoned inbound-interactions may be stored in the data store of abandoned inbound-interactions 115 in FIG. 1A-1B, as part of a process of an inbound Interactive Voice Response (IVR) interaction.

According to some embodiments of the present disclosure, for example, the IVR input of an interaction may include language selection 510, query context selection 530, such as plan change query with regards to how best suited plans 535 and a request to be fora Larded to an agent 550.

According to some embodiments of the present disclosure, for various reasons, such as long waiting time, schedule change of the customer, network issues and the like, the interaction may be abandoned and its details may be stored in a data store, such as data store of abandoned inbound-interactions 515, and such as data store of abandoned inbound-interactions 115 in FIGS. 1A-1B.

According to some embodiments of the present disclosure, a module, such as Abandoned Interactions Input Utilization (AIIU) module 520 may operate an accumulator module 540 to: (i) retrieve abandoned inbound-interactions from the data store of abandoned inbound-interactions 515 and (ii) forward details of the abandoned inbound-interactions to an analyzer module 525.

According to some embodiments of the present disclosure, for each abandoned inbound-interaction of the abandoned inbound-interactions, the AIIU module 520 may operate the analyzer module 525 on the forwarded details of abandoned inbound-interactions to: (i) extract query context and metadata and (ii) identify a satisfactory digital-channel type.

According to some embodiments of the present disclosure, the AIIU module 520 may operate a processor module 530 to: (i) identify an agent, having skills to handle the extracted query, such as agent 580 and (ii) prepare a task, such as task 570 based on the extracted query context and metadata and the identified satisfactory digital-channel type, e.g., 575.

According to some embodiments of the present disclosure, the AIIU module 520 may send the task 570 to a routing system (not shown) to be assigned to the identified agent 580 for operation thereof via the identified satisfactory digital-channel type 575.

Figure 5B:
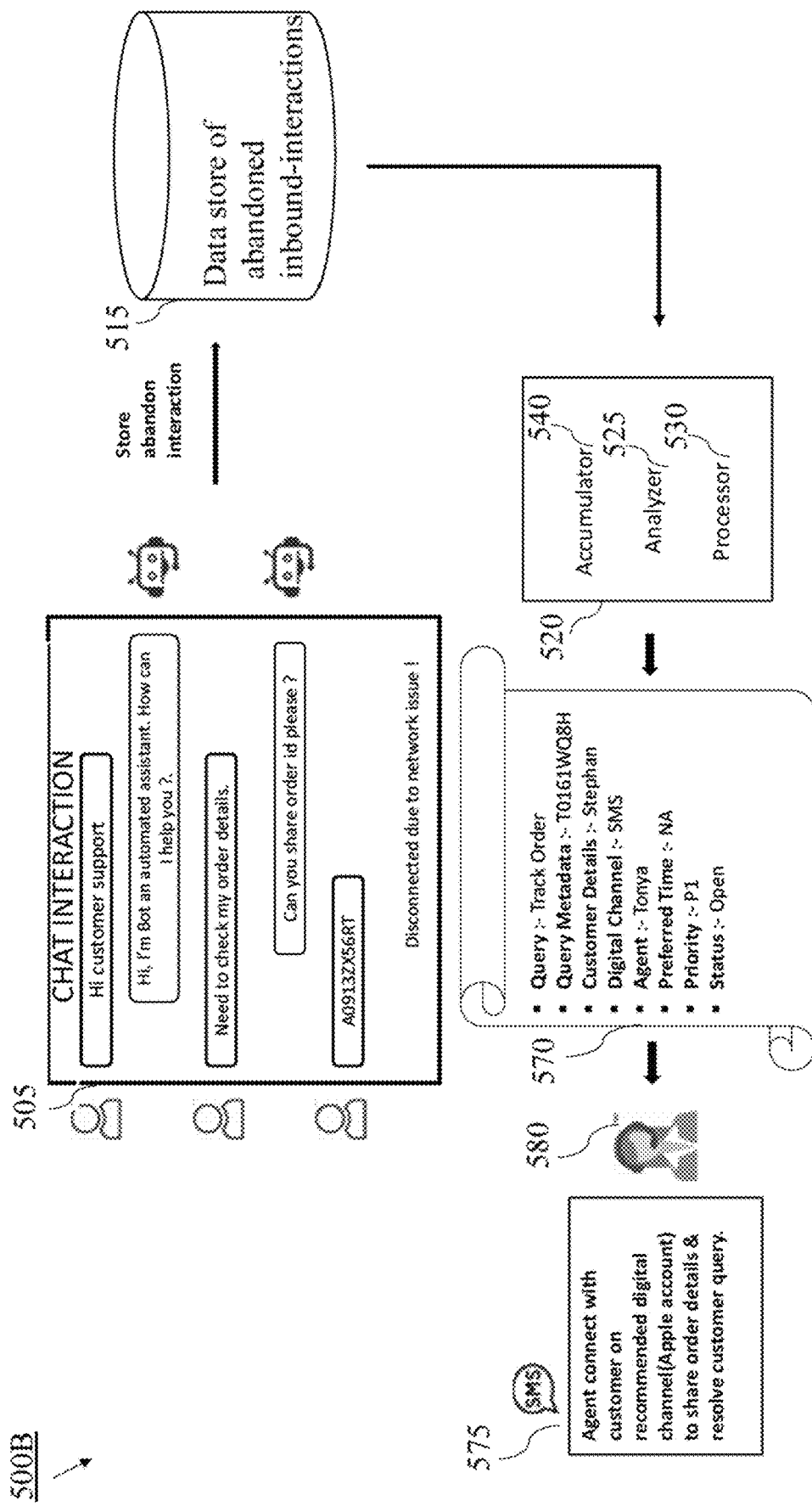
FIG. 5B schematically illustrates the details of the abandoned inbound-interactions received from a process of an inbound chat-interaction with a bot.

FIG. 5B schematically illustrates details of the abandoned inbound-interactions received from a process of an inbound chat-interaction with a hot 500B, in accordance with some embodiments of the present disclosure.

According to some embodiments of the present disclosure, the details of the abandoned inbound-interactions may be stored in the data store of abandoned inbound-interactions 115 in FIGS. 1A-1B as part of a process of an inbound chat-interaction with a bot.

According to some embodiments of the present disclosure, for example, the input from the chat-interaction with a hot, may include query context selection 510, such as check order details and order identification (id).

According to some embodiments of the present disclosure, for various reasons, such as long waiting time, schedule change of the customer, network issues and the like, the interaction may be abandoned and its details may be stored in a data store, such as data store of abandoned inbound-interactions 515, and such as data store of abandoned inbound-interactions 115 in. FIGS. 1A-1B.

According to some embodiments of the present disclosure, a module, such as Abandoned. Interactions Input Utilization (ATTU) module 520 may operate an accumulator module 540 to: (i) retrieve abandoned inbound-interactions from the data store of abandoned inbound-interactions 515 and (ii) forward details of the abandoned inbound-interactions to an analyzer module 525.

According to some embodiments of the present disclosure, for each abandoned inbound-interaction of the retrieved abandoned inbound-interactions, the AIIU module 520 may operate the analyzer module 525 on the forwarded details of abandoned inbound-interactions to: (i) extract query context and metadata; and (ii) identify a satisfactory digital-channel type.

According to some embodiments of the present disclosure, the AIIU module 520 may operate a processor module 530 to: (i) identify an agent, having skills to handle the extracted query, such as agent 580 and (ii) prepare a task, such as task 570 based on the extracted query context and metadata and the identified satisfactory digital-channel type, e.g., 575.

According to some embodiments of the present disclosure, the AIIU module 520 may send the task 570 to a routing system (not shown) to be assigned to the identified agent 580 the task 570 for operation thereof via the identified satisfactory digital-channel type 575.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to he understood that the appended claims are intended to cover all such modifications and changes as fall within the true spirit of the disclosure.

What is claimed:

1. A computerized-method for enhancing customers satisfaction by assigning abandoned inbound-interactions to agents each on a satisfactory digital-channel type, the computerized-method comprising:
   in a computerized system comprising one or more processors, a data store of abandoned inbound-interactions; and a memory to store the data store, said one or more processors are operating an Abandoned Interactions Input Utilization (AIIU) module, said AIIU module comprising:
   (a) operating an accumulator module to: (i) retrieve abandoned inbound-interactions from the data store of abandoned inbound-interactions and (ii) forward details of the abandoned inbound-interactions to an analyzer module;
   (b) for each abandoned inbound-interaction of the abandoned inbound-interactions,
      a. operating the analyzer module on the forwarded details of abandoned inbound-interactions to: (i) extract query context and metadata; and (ii) identify a satisfactory digital-channel type;
      b. operating a processor module to: (i) identify an agent having skills to handle the extracted query and (ii) prepare a task based on the extracted query context and metadata and the identified satisfactory digital-channel type; and
   (c) sending the task to a routing system to be assigned to the identified agent for operation thereof via the identified satisfactory digital-channel type.

2. The computerized-method of claim 1, wherein the analyzer module is identifying the satisfactory digital-channel-type by: (i) retrieving one or more digital-channel preferences of a customer related to the abandoned inbound-interaction from a data store of customer presence on digital-channels;
   (ii) retrieving data of interactions having the query context of the abandoned inbound-interaction to extract one of more digital-Channel types thereof from a data store of historical-interactions; (iii) comparing the one or more digital-channel preferences of the customer and the extracted one or more digital-channel types to yield a list of common digital-channel types; and (iv) identifying a digital-channel type of an interaction having a highest Customer Satisfaction Score (CSAT) and a digital-channel type in the yielded list of common digital-channel types, in the retrieved data of interactions having the query context of the abandoned inbound-interaction as the satisfactory digital-channel type.

3. The computerized-method of claim 1, wherein the details of the abandoned inbound-interactions are stored in the data store of abandoned inbound-interactions as part of a process of: (i) inbound Interactive Voice Response (IVR) interaction or (ii) inbound chat-interaction with a hot.

4. The computerized-method of claim 1. wherein the accumulator module removes abandoned inbound-interactions which lack a preconfigured required-input in the details abandoned inbound-interactions before the accumulator module forwards the details of the abandoned inbound-interactions to the analyzer module.

5. The computerized-method of claim 1, wherein the details of the abandoned inbound-interactions are forwarded by using a file format of: JavaScript Object Notation (JSON) or an Extensible Markup Language (XML).

6. The computerized-method of claim 1, wherein a task includes at least two of: (i) query context; (ii) customer details; (iii) digital channel type; (iv) preferred contact time; and (v) priority.

7. The computerized-method of claim 1, wherein When the computerized-method is operating in a cloud computing environment, before operating the Anti module the computerized-method is further comprising selecting a tenant from a data store of tenants to operate the ATM module for abandoned interactions of the selected tenant.

8. The computerized-method of claim 1, wherein the AIIU module is operating every preconfigured duty cycle.

9. A computerized-system for enhancing customers satisfaction by assigning abandoned inbound-interactions to agents each on a satisfactory digital-channel type, the computerized- system comprising:
   one or more processors,
   a data store of abandoned inbound-interactions; and
   a memory to store the data store,
   said one or more processors are configured to operate an Abandoned Interactions Input Utilization (AIIU) module, said AIIU module comprising:
   (a) operating an accumulator module to: (1) retrieve abandoned inbound-interactions from the data store of abandoned inbound-interactions and (ii) forward details of the abandoned inbound-interactions to an analyzer module;
   (b) for each abandoned inbound-interaction of the abandoned inbound-interactions,
      a. operating the analyzer module on the forwarded details of abandoned inbound-interactions to: (i) extract query context and metadata; and (ii) identify a satisfactory digital-channel type;
      b. operating a processor module to: (i) identify an agent having skills to handle the extracted query and (ii) prepare a task based on the extracted query context and metadata and the identified satisfactory digital-channel type; and (c) sending the task to a routing system to be assigned to the identified agent for operation thereof via the identified satisfactory digital-channel.

\* \* \* \* \*